(12) United States Patent
Bender et al.

(10) Patent No.: US 6,257,619 B1
(45) Date of Patent: Jul. 10, 2001

(54) MULTIPLE POSITION STABILIZER LEG

(75) Inventors: John L. Bender, East Peoria; Sridhar Jaganathan, Peoria Heights, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/565,503

(22) Filed: May 5, 2000

Related U.S. Application Data

(60) Provisional application No. 60/141,725, filed on Jun. 30, 1999.

(51) Int. Cl.$^7$ .................................................. B60S 9/02
(52) U.S. Cl. ........................................ 280/764.1; 212/304
(58) Field of Search ............................ 280/764.1, 763.1, 280/765.1, 766.1, 6.156; 212/301, 302, 304, 204, 305

(56) References Cited

U.S. PATENT DOCUMENTS

| | | |
|---|---|---|
| 3,612,574 * | 10/1971 | Klopper . |
| 3,759,541 | 9/1973 | Peterson . |
| 4,013,307 | 3/1977 | Dowd et al. . |
| 4,241,803 * | 12/1980 | Lauber ........................ 280/765.1 X |
| 4,244,599 | 1/1981 | Gauchet . |
| 4,265,326 * | 5/1981 | Lauber . |
| 4,266,627 * | 5/1981 | Lauber . |
| 4,311,322 | 1/1982 | Verros . |
| 4,345,873 * | 8/1982 | Wymore ........................ 212/305 X |
| 4,437,682 * | 3/1984 | Yokohama et al. ............... 280/764.1 |
| 4,596,404 * | 6/1986 | F'Geppert ........................ 380/764.1 |
| 4,619,369 | 10/1986 | Mertens . |
| 4,921,392 | 5/1990 | Wagner . |
| 5,051,057 | 9/1991 | Kremer . |
| 5,383,563 | 1/1995 | Richtsfeld et al. . |
| 5,706,960 * | 1/1998 | Pitman et al. ...................... 212/304 |

FOREIGN PATENT DOCUMENTS

| | | |
|---|---|---|
| 3728292 * | 11/1971 | (DE) . |
| 54-118024 * | 9/1979 | (JP) . |
| 286169 * | 11/1971 | (RU) . |

* cited by examiner

Primary Examiner—Brian L. Johnson
Assistant Examiner—Bryan Fischmann
(74) Attorney, Agent, or Firm—Marla L. Hudson; Diana L. Charlton

(57) ABSTRACT

A mobile machine having a machine frame with a first side and a second side. A stabilizer leg is located at each of the first and second sides of the machine frame, and is movable between a first ground-engaging position and a second ground-engaging position. The stabilizer leg includes a first linkage, a second linkage, a third linkage, and a fourth linkage. A first end portion of the first linkage is pivotally connected to the machine frame, and a second end portion of the first linkage is pivotally connected to one end portion of the second linkage. A first end portion of the third linkage is connected to the machine frame via the fourth linkage, and a second end portion of the third linkage is connected to the one end portion of the second linkage. A recessed area of the third linkage is adapted to receive the first linkage when the stabilizer leg is in the first ground engaging position. The first linkage is adapted to move out of the recessed area to define a spaced relationship between top portions of the first and third linkages so that the third linkage is located at a bottom portion of the first linkage when the stabilizer leg is in the second ground-engaging position.

21 Claims, 4 Drawing Sheets

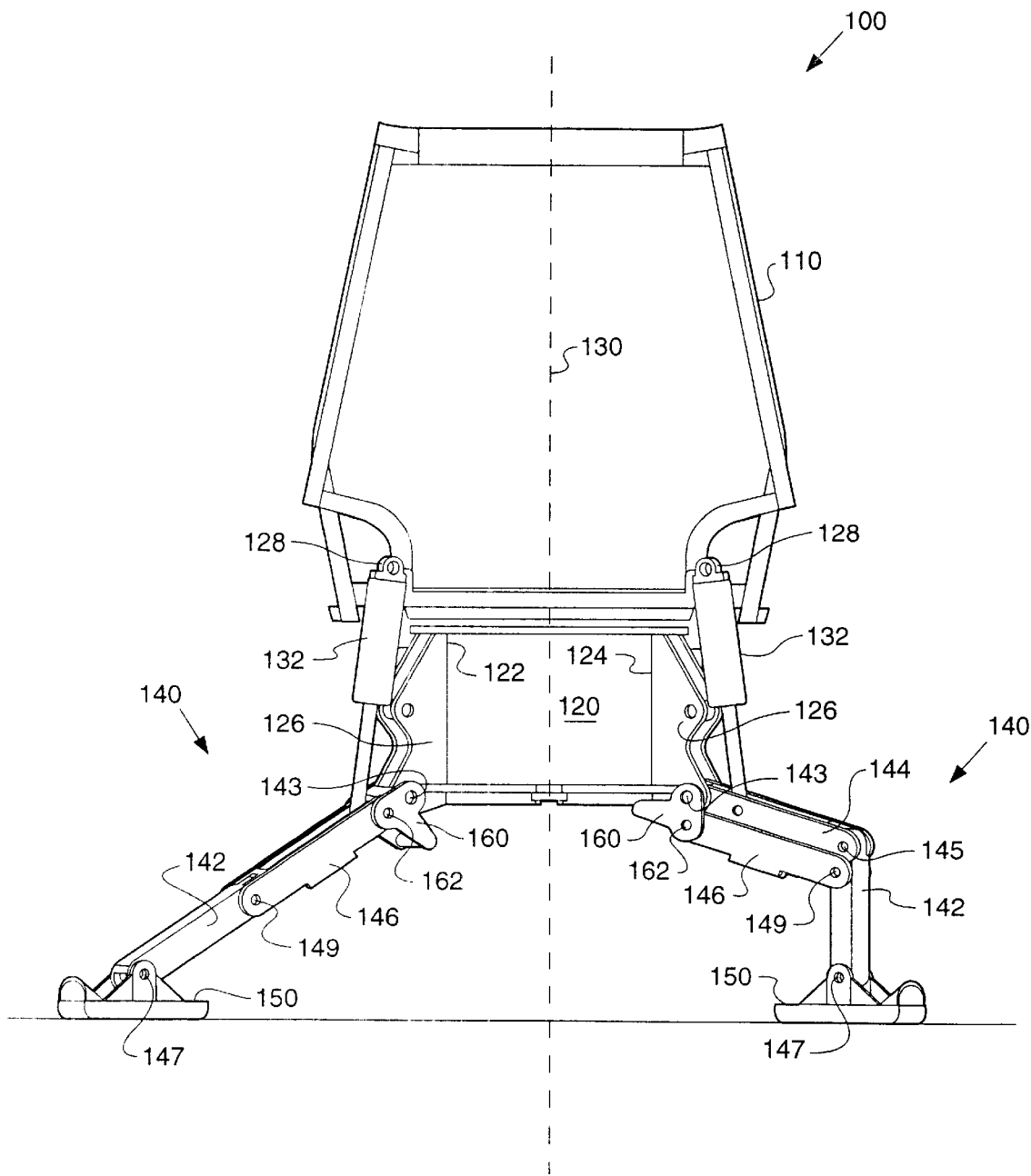
Fig_1_

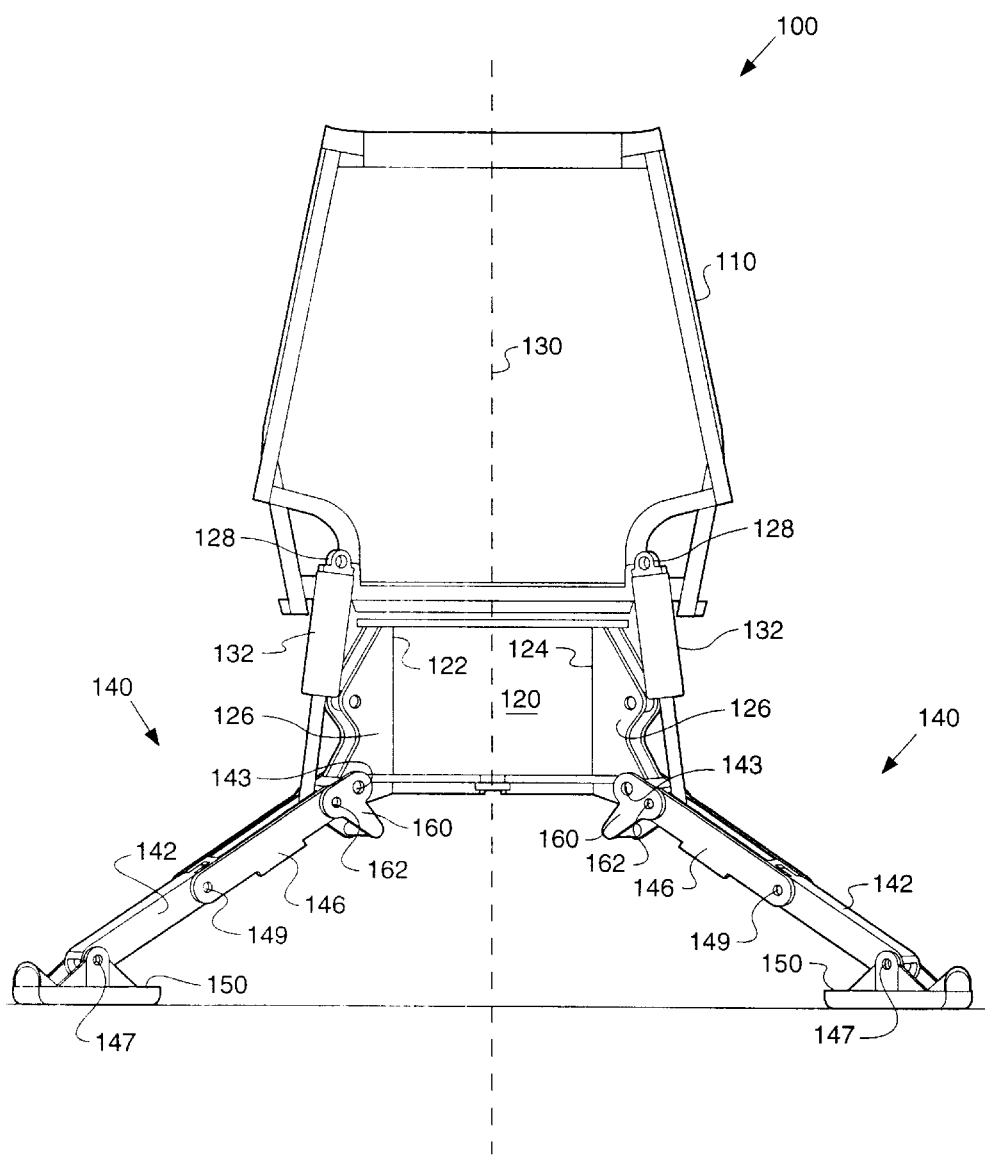

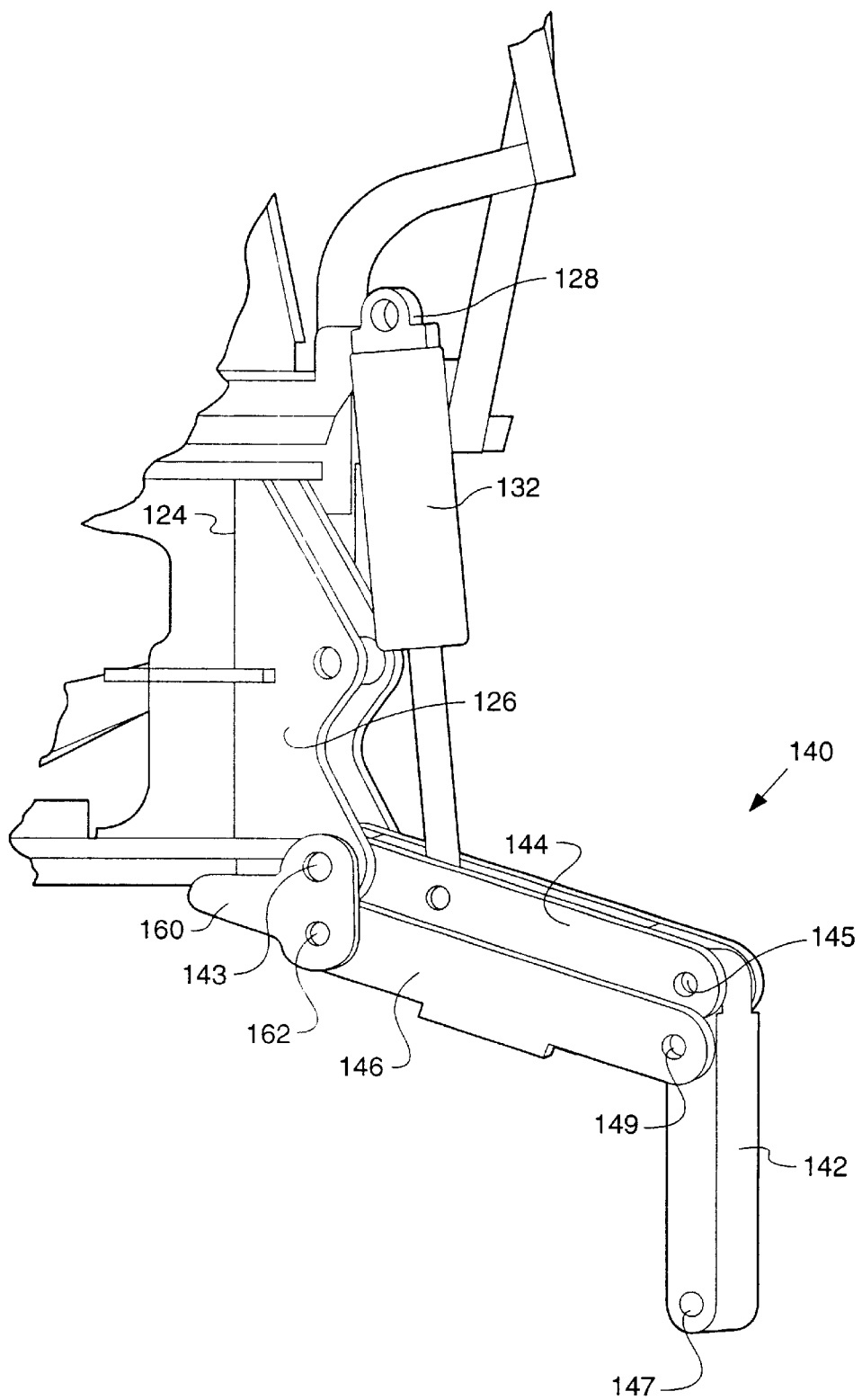
Fig_3b_

MULTIPLE POSITION STABILIZER LEG

This application claims benefit of provisional application Ser. No. 60/141,725 filed Jun. 30, 1999.

TECHNICAL FIELD

This invention relates generally to a stabilizer leg for a mobile machine and, more particularly, to a stabilizer leg adapted to be adjusted to multiple positions.

BACKGROUND ART

Many types of mobile machines have stabilizer legs, or outriggers, which extend downwardly and outwardly from the sides of the machine. During various digging and excavating operations of the work implement, the stabilizer legs are adapted to engage the ground to laterally support the machine against tipping. The stabilizer legs may also act to anchor the machine to the ground by raising the wheels at the end of the machine having the work implement off the ground.

Typically, mobile machines, such as backhoe loaders, include stabilizer legs that are configured in one of two common arrangements. For example, in one arrangement, the stabilizer legs are configured so as to extend outwardly and laterally from opposite sides of the machine. In this arrangement, the stabilizer legs extend past the normal width of the machine, i.e., past the wheels of the machine, thus providing maximum stability. However, this arrangement prevents the machine from operating in tighter spaces, where it may be necessary to dig close to a wall or other structure. In an alternative arrangement, the stabilizer legs move vertically, and are positioned at about the same width as the normal width of the machine. This arrangement allows the mobile machine to work in tighter spaces, but at the sacrifice of stability.

The present invention is directed to overcoming one or more of the problems as set forth above.

DISCLOSURE OF THE INVENTION

In one aspect of the present invention a mobile machine having a machine frame is provided. The machine frame includes a first side and a second side. A stabilizer leg is located at each of the first and second sides of the machine frame, and is movable between a first ground-engaging position and a second ground-engaging position. The stabilizer leg includes a first linkage, a second linkage, a third linkage, and a fourth linkage. A first end portion of the first linkage is pivotally connected to the machine frame and a second end portion of the first linkage is pivotally connected to one end portion of the second linkage. The third linkage includes a recessed area, a first end portion, and a second end portion. The first end portion of the third linkage is connected to the machine frame via the fourth linkage. The second end portion of the third linkage is connected to the one end portion of the second linkage at a separate location than the connection between the second end portion of the first linkage and the one end portion of the second linkage. The recessed area of the third linkage is adapted to receive the first linkage when the stabilizer leg is in the first ground engaging position. The first linkage is adapted to move out of the recessed area of the third linkage to define a spaced relationship between a top portion of the first linkage and a top portion of the third linkage so that the third linkage is located at a bottom portion of the first linkage when the stabilizer leg is in the second ground-engaging position.

In another aspect of the present invention, mobile machine having a machine frame is provided. The machine frame includes a first side, a second side, and a vertically oriented centerline located intermediate the first and second sides. A stabilizer leg is located at each of the first and second sides of the machine frame. The stabilizer leg is movable between a first ground-engaging position and a second ground-engaging position. The stabilizer leg includes a first linkage, a second linkage, a third linkage, a fourth linkage, and a stabilizer pad. The first linkage includes a first end portion and a second end portion opposite the first end portion. The first end portion of the first linkage is pivotally connected to the machine frame at a first pivot point. The second end portion of the first linkage is pivotally connected to one end of the second linkage at a second pivot point. The stabilizer pad is connected at a free end of the second linkage at a third pivot point. The third linkage includes a recessed portion, a first end portion, and a second end portion opposite the first end portion. The first end portion of the third linkage is connected to the machine frame. The second end portion of the third linkage is connected to the one end of the second linkage at a fourth pivot point. The fourth linkage is adapted to connect the third linkage to the machine frame. A first end portion of the fourth linkage is pivotally connected to the machine frame at the first pivot point. An opposed second end portion of the fourth linkage is connected to the first end portion of the third linkage at a fifth pivot point. The recessed area of the third linkage is adapted to receive the first linkage and the second linkage is disposed generally perpendicular with respect to the centerline when the stabilizer leg is in the first ground-engaging position. The third linkage is generally parallel with respect to the first linkage and located at a bottom portion of the first linkage and the second linkage is disposed generally parallel with respect to the centerline when the stabilizer leg is in the second ground-engaging position.

In yet another aspect of the present invention, a method of achieving multiple positions of a stabilizer leg for a mobile machine with a frame having a centerline is provided. The method comprises the steps of providing first, second, third, and fourth linkages on the stabilizer leg. The first linkage includes a first end portion pivotally connectable to the machine frame and a second end portion pivotally connected to one end portion of the second linkage. The third linkage includes a first end portion connectable to the machine frame via the fourth linkage and a second end portion pivotally connected to the one end portion of the second linkage at a separate location from the connection between the second end portion of the first linkage and the one end portion of the second linkage. Next, the stabilizer leg is lowered to a ground surface in a first ground-engaging position. The first ground-engaging position is defined by moving the fourth linkage away from the machine frame so that the first linkage is received within a recessed area of the third linkage and a longitudinal axis for each of the first, second, and third linkages are axially aligned and generally perpendicular with respect to the centerline of the machine frame. Then, the stabilizer leg is raised from the ground surface. Next, the fourth linkage is moved into abutment with the frame of the machine to establish a second ground-engaging position wherein the longitudinal axes for the first and third linkages are spaced and parallel and the longitudinal axis for the second linkage is generally parallel with respect to the centerline of the machine frame. Finally, the stabilizer leg is lowered to the ground surface in the second ground-engaging position.

The present invention includes the ability to adjust a pair of stabilizer legs on a work machine to multiple positions through the utilization of a plurality of linkages. This ability provides a simple method to achieve both stability and flexibility of the work machine in open and tight working spaces, respectively.

BRIEF DESCRIPTION OF THE DRAWINGS

FIG. 1 is a rear view of a mobile machine illustrating a pair of stabilizer legs in a selected position utilizing the present invention;

FIG. 2 is a rear view of the mobile machine illustrating another selected position of the pair of stabilizer legs utilizing the present invention;

FIG. 3b is another enlarged, perspective view of the stabilizer leg in a lowered position depicted in the second ground-engaging position.

BEST MODE FOR CARRYING OUT THE INVENTION

Figure 3A:
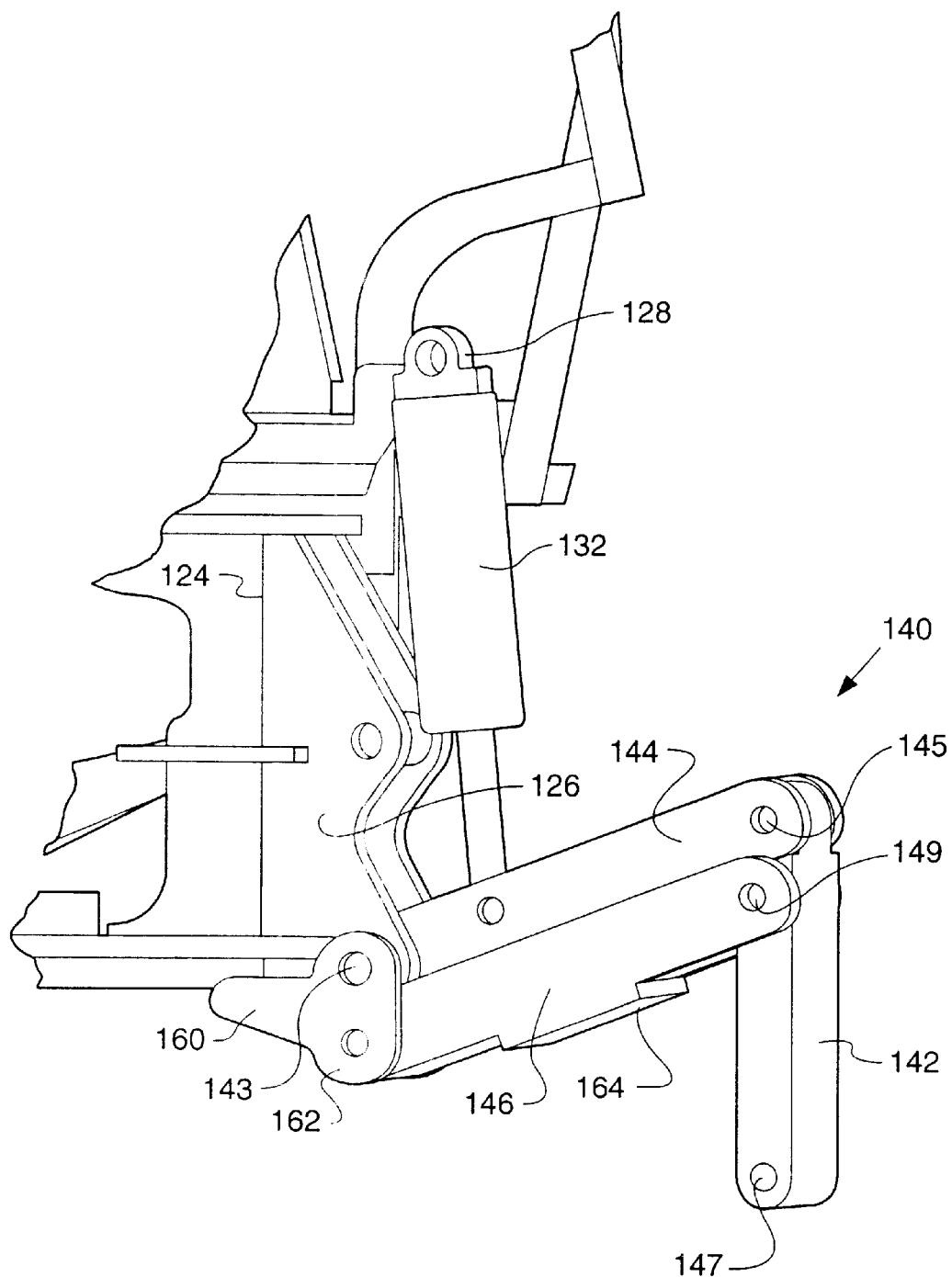
FIG. 3a is an enlarged, perspective view of a stabilizer leg in a partially raised position depicted in the second ground-engaging position.

With reference to FIGS. 1–3b, the present invention provides a multiple position stabilizer leg 140 adapted for use on a mobile machine 100.

With particular reference to FIG. 1, a rear view of a mobile machine 100 illustrating one embodiment of the present invention is shown. The mobile machine 100 used for exemplary purposes to describe the invention is of the type commonly referred to as a "backhoe loader" or "backhoe". However, it is to be realized that any number of other types of mobile machines 100 that utilize stabilizer legs 140, such as excavators, and the like, may be substituted without departing from the spirit of the invention.

The mobile machine 100 includes a machine frame 120 which can be driven on wheels (not shown) or other ground-engaging supports, e.g., tracks, and an operator's cab 110 supported on the machine frame 120. The machine frame 120 includes a first side 122 and an opposed second side 124. A vertically oriented centerline 130 is located intermediate the first and second sides 122,124.

The machine frame 120 further includes a bracket 126 rigidly connected at each of the first and second sides 122,124. The bracket 126 includes a pair of generally parallel plates located in a fixed spaced apart relationship. Each of the plates of the bracket 126 includes apertures at a lowermost portion thereof. The apertures are aligned to define a first pivot point 143.

In order to provide stabilization for the mobile machine 100 during various digging and excavating operations, a stabilizer leg 140 is located rearwardly at each of the first and second sides 122,124 of the machine frame 120. The stabilizer legs 140 are of an identical configuration, and only the stabilizer leg 140 at the right side of the mobile machine 100 will be discussed to detail.

The stabilizer leg 140 includes a first linkage 144, a second linkage 142, and a third linkage 146. The first linkage 144 includes a first end portion, and a second end portion opposite the first end portion. The first end portion of the first linkage 144 is pivotally connected to the machine frame 120 between the spaced apart plates of the bracket 126 at the first pivot point 143. The second end portion of the first linkage 144 is pivotally connected to one end portion of the second linkage 142 at a second pivot point 145.

The first linkage 144 further includes a first pair of arms spaced apart from each other in a parallel relationship, and defining an opening therebetween. The opening permits the attachment of an actuator 132 adapted to pivot the stabilizer leg 140 about the first pivot point 143. The actuator 132 includes an upper end 128 that may be mounted to the mobile machine 100 in any suitable manner, and a lower end connected between the opening of the first linkage 144.

The actuator 132, preferably a hydraulic cylinder, is adapted to move the stabilizer leg 140 between a raised, upright position during transport, and a lowered, ground-engaging position during operation. More specifically, the stabilizer leg 140 is pivoted about the first pivot point 143 to a raised position by retracting the actuator 132, and to a lowered position by extending the actuator 132.

A stabilizer pad 150 or foot, is pivotally connected at the free end of the second linkage 142 at a third pivot point 147. The stabilizer pad 150 is in contact or engagement with the surface of the ground during stabilization, and pivotally adjusts dependent upon the surrounding terrain, as is well known in the art.

The third linkage 146 includes a first end portion, and a second end portion opposite the first end portion. The first end portion of the third linkage 146 is connected to the machine frame 120 via a fourth linkage 160 (discussed in more detail below). The second end portion of the third linkage 146 is connected to the one end portion of the second linkage 142 at a fourth pivot point 149.

The fourth linkage 160 includes a first end portion connected to an outer portion of the bracket 126 at the first pivot point 143, and an opposed second end portion of the fourth linkage 160 connected to the first end portion of the third linkage 146 at a fifth pivot point 162. The fourth linkage 160 further includes a projecting end extending outwardly toward the centerline 130. The fourth linkage 160 is adapted to connect the third linkage 146 to the bracket 126 of the machine frame 120, and will be discussed in more detail below.

The third linkage 146 further includes a recessed area defined by a second pair of arms and a base plate 164. The second pair of arms are disposed in a parallel, spatial relationship, and are interconnected by the base plate 164, substantially as shown in FIG. 3a. The recessed area of the third linkage 146 is generally u-shaped, and extends the length of the third linkage 146.

With reference to FIG. 1, the stabilizer leg 140 is movable between a first ground-engaging position depicted on the left side of the mobile machine 100, and a second ground-engaging position depicted on the right side of the mobile machine 100.

When the stabilizer leg 140 is in the first ground-engaging position, the recessed area of the third linkage 146 is adapted to receive the first linkage 144 therein. The base plate 164 of the third linkage 146 acts to support the first linkage 144 in this arrangement.

In the first ground-engaging position, the second linkage 142 is disposed generally perpendicular with respect to the centerline 130. Additionally, the third linkage 146 is generally parallel with respect to the first linkage 144 so that the longitudinal axes of the first and third linkages 144,146 are substantially axially aligned. In this manner, the stabilizer leg 140 forms a straight line extending laterally from the side of the mobile machine 100, with the longitudinal axes of the first and third linkages 144,146 being in axial alignment with a longitudinal axis of the second linkage 142. It should be understood that the first and third linkages 144,146 are releasably connected together in any suitable manner, such as through a latching mechanism, to maintain the stabilizer leg 140 in the first ground-engaging position. The projecting end of the fourth linkage 160 extends downward toward the surface of the ground, and away from the machine frame 120.

When the stabilizer leg 140 is in the second ground-engaging position, the third linkage 146 remains generally parallel with respect to the first linkage 144 so that the longitudinal axes of the first and third linkages 144,146 are spaced and parallel. More specifically, the third linkage 146 is located at a bottom portion of the first linkage 144 with a top portion of the third linkage 146 and a top portion of the first linkage 144 being spaced a predetermined distance from one another. In the second ground-engaging position, the second linkage 142 is disposed generally parallel with respect to the centerline 130, with the parallel first and third linkages 144,146 generally perpendicular with respect to the vertically disposed second linkage 142. In addition, the projecting end of the fourth linkage 160 extends upward toward the machine frame 120, and is held in abutment with a bottom surface of the machine frame 120 when the stabilizer leg 140 is in the second ground-engaging position.

In the preferred embodiment, the projecting end of the fourth linkage 160 is moved from a downward position to an upward position via an operator-controlled actuator 132, e.g., a hydraulic cylinder. In this embodiment, the operator remotely controls movement of the projecting end of the fourth linkage 160, via a pushbutton, lever, or similar control device located within the cab 110. Alternately, the projecting end of the fourth linkage 160 may manually be unlatched, and moved from the downward position to the upward position, and vice-versa. It should be understood that a latching mechanism (not shown) of any suitable type may be provided to lock the projecting end of the fourth linkage 160 into abutting contact with the bottom surface of the machine frame 120, thus maintaining the stabilizer leg 140 in the second ground-engaging position.

Referring now to FIG. 2, a rear view of the mobile machine 100 having both stabilizer legs 140 positioned in the first ground-engaging position is shown. Alternately, both stabilizer legs 140 may be positioned in the second ground-engaging position. Still further, one stabilizer leg 140 may be positioned in the first ground-engaging position and the other stabilizer leg 140 may be positioned in the second ground-engaging position, as illustrated in FIG. 1.

While the present invention has been described with respect to stabilizer legs 140 located at a rear portion of the mobile machine 100, it is to be understood, that the present invention is equally applicable to stabilizer legs 140 located at a forward portion of the mobile machine 100.

INDUSTRIAL APPLICABILITY

Under actual operating conditions, when it is desired to move the stabilizer leg 140 from a raised position to a lowered position, the operator causes the actuator 132 to lower the stabilizer leg 140 into contact with the ground surface. It is to be noted that in the partially raised position shown in FIG. 3a, the stabilizer leg 140 is in the configuration of the second ground-engaging position, with the second linkage 142 in a vertical position, generally parallel with respect to the centerline 130, as discussed above. However, it should be understood that the stabilizer leg 140 may be in either the first or second ground-engaging positions when the stabilizer leg 140 is in the raised position. Further, it should be understood that the stabilizer leg 140 may be moved through the entire range of motion when in either the first or second ground-engaging position.

In order to position the stabilizer leg 140 in the second ground-engaging position on the ground surface, the projecting end of the fourth linkage 160 is latched into abutting contact with the bottom surface of the machine frame 120 when in the raised position, as depicted in FIG. 3a. Thereafter, the actuator 132 may further be extended to a maximum length, as illustrated in FIG. 3b, to lower the stabilizer leg 140 into engagement with the ground surface.

In order to position the stabilizer leg 140 from the second ground-engaging position, shown in FIG. 3a, to the first ground-engaging position, the projecting end of the fourth linkage 160 is unlatched, and moved into a position facing downwardly away from the machine frame 120. The second linkage 142 is then moved from a vertically disposed position, to a generally horizontal position with respect to the centerline 130. This movement causes the first linkage 144 to be located within the recessed area of the third linkage 146, and thus the respective longitudinal axes of the third linkage 146 and the second linkage 142 are aligned to form one straight stabilizer leg 140. The third linkage 146 is latched to the first linkage 144 in any suitable manner when in the raised position to maintain the stabilizer leg 140 in the first ground-engaging position. Thereafter, the actuator 132 may further be extended to a maximum length, as illustrated in FIG. 2, to lower the stabilizer leg 140 into engagement with the ground surface.

The ability to move the stabilizer legs 140 easily between the first and second ground-engaging positions provides for machine stability under various working conditions. This is true because the first ground-engaging position allows for conventional stability within wide-open working spaces. Due to the fact that the second linkage 142 never moves beyond the width of the machine 100 when in the second ground-engaging position, stability is also achieved within constricted working spaces such as when the machine 100 is next to a wall or similar obstruction. Further, the ability to easily move from the first ground-engaging position to the second ground-engaging position increases flexibility of the machine 100 to achieve quick adjustment between the various working conditions.

Other aspects, objects, and features of the present invention can be obtained from a study of the drawings, the disclosure, and the appended claims.

What is claimed is:

1. A mobile machine, comprising:
   a machine frame having a first side and an opposed second side;
   a stabilizer leg located at each of the first and second sides of the machine frame, and movable between a first ground-engaging position and a second ground-engaging position, the stabilizer leg including a first linkage, a second linkage, a third linkage, and a fourth linkage, a first end portion of the first linkage being pivotally connected to the machine frame, and a second end portion of the first linkage being pivotally connected to one end portion of the second linkage;
   wherein the third linkage includes a recessed area, a first end portion, and a second end portion, the first end portion of the third linkage connected to the machine frame via the fourth linkage, and the second end portion of the third linkage connected to the one end portion of the second linkage at a separate location than the connection between the second end portion of the first linkage and the one end portion of the second linkage;

wherein the recessed area of the third linkage is adapted to receive the first linkage when the stabilizer leg is in the first ground engaging position; and wherein the first linkage is adapted to move out of the recessed area of the third linkage to define a spaced relationship between a top portion of the first linkage and a top portion of the third linkage so that the third linkage is located at a bottom portion of the first linkage when the stabilizer leg is in the second ground-engaging position.

2. The mobile machine, as set forth in claim 1, wherein the machine frame further includes a vertically oriented centerline located intermediate the first and second sides, wherein the second linkage is disposed generally perpendicular with respect to the centerline when the stabilizer leg is in the first ground-engaging position, and wherein the second linkage is disposed generally parallel with respect to the centerline when the stabilizer leg is in the second ground-engaging position.

3. The mobile machine, as set forth in claim 2, wherein a longitudinal axis of the first linkage is in axial alignment with longitudinal axes of the second and third linkages when the stabilizer leg is in the first ground-engaging position and the longitudinal axis of the first linkage spaced from and parallel with the longitudinal axis of the third linkage when the stabilizer leg is in the second ground-engaging position.

4. The mobile machine, as set forth in claim 2, wherein the first and third linkages are generally perpendicular with respect to the second linkage in the second ground-engaging position.

5. The mobile machine, as set forth in claim 1, wherein the first linkage includes a first pair of arms spaced apart from each other in a parallel relationship, and defining an opening therebetween.

6. The mobile machine, as set forth in claim 5, further including an actuator having an upper end pivotally connected to the mobile machine, and a lower end pivotally connected between the opening defined by the first pair of arms of the first linkage.

7. The mobile machine, as set forth in claim 6, wherein the actuator is adapted to move the stabilizer leg between a raised position and a lowered position.

8. The mobile machine, as set forth in claim 6, wherein the actuator includes a hydraulic cylinder.

9. The mobile machine, as set forth in claim 1, wherein the recessed area of the third linkage is defined by a second pair of arms and a base plate, wherein the second pair of arms are disposed in a parallel, spatial relationship, and interconnected by the base plate.

10. The mobile machine, as set forth in claim 1, wherein the recessed area of the third linkage is generally u-shaped, and extends the length of the third linkage.

11. The mobile machine, as set forth in claim 1, wherein the stabilizer leg further includes a stabilizer pad pivotally connected at a free end of the second linkage.

12. The mobile machine, as set forth in claim 1, wherein the machine frame includes a bracket located at each of the first and second sides of the machine frame, the bracket including a pair of generally parallel plates located in a fixed spaced apart relationship, wherein the first linkage is pivotally connected between the spaced apart plates at a pivot point.

13. The mobile machine, as set forth in claim 12, wherein a first end portion of the fourth linkage is pivotally connected to the machine frame at the pivot point, and a second end portion of the fourth linkage is connected to the first end portion of the third linkage.

14. The mobile machine, as set forth in claim 13, wherein the fourth linkage includes a projecting end extending outwardly toward the centerline.

15. The mobile machine, as set forth in claim 14, wherein the projecting end of the fourth linkage extends away from the machine frame when the stabilizer leg is in the first ground-engaging position.

16. The mobile machine, as set forth in claim 14, wherein the projecting end of the fourth linkage is in abutment with a bottom surface of the machine frame when the stabilizer leg is in the second ground-engaging position.

17. A mobile machine, comprising:

a machine frame having a first side and a second side, the machine frame further including a vertically oriented centerline located intermediate the first and second sides;

a stabilizer leg located at each of the first and second sides of the machine frame, and movable between a first ground-engaging position and a second ground-engaging position, the stabilizer leg including a first linkage, a second linkage, a third linkage, a fourth linkage, and a stabilizer pad;

wherein the first linkage includes a first end portion, and a second end portion opposite the first end portion, the first end portion of the first linkage being pivotally connected to the machine frame at a first pivot point, the second end portion of the first linkage being pivotally connected to one end of the second linkage at a second pivot point, and the stabilizer pad being connected at a free end of the second linkage at a third pivot point;

wherein the third linkage includes a recessed portion, a first end portion, and a second end portion opposite the first end portion, the first end portion of the third linkage being connected to the machine frame, and the second end portion of the third linkage connected to the one end of the second linkage at a fourth pivot point;

wherein the fourth linkage is adapted to connect the third linkage to the machine frame, a first end portion of the fourth linkage being pivotally connected to the machine frame at the first pivot point, and an opposed second end portion of the fourth linkage is connected to the first end portion of the third linkage at a fifth pivot point;

wherein the recessed area of the third linkage is adapted to receive the first linkage, and the second linkage is disposed generally perpendicular with respect to the centerline, when the stabilizer leg is in the first ground-engaging position; and wherein the third linkage is generally parallel with respect to the first linkage, and located at a bottom portion of the first linkage, and the second linkage is disposed generally parallel with respect to the centerline when the stabilizer leg is in the second ground-engaging position.

18. A method of achieving multiple positions of a stabilizer leg for a mobile machine having a frame with a centerline, comprising the steps of:

providing first, second, third, and fourth linkages on the stabilizer leg, the first linkage including a first end portion pivotally connectable to the machine frame and a second end portion pivotally connected to one end portion of the second linkage, the third linkage including a first end portion connectable to the machine frame via the fourth linkage and a second end portion pivotally connected to the one end portion of the second linkage at a separate location from the connection between the second end portion of the first linkage and the one end portion of the second linkage;

lowering the stabilizer leg to a ground surface in a first ground-engaging position defined by moving the fourth linkage away from the machine frame so that the first linkage is received within a recessed area of the third linkage and a longitudinal axis for each of the first, second, and third linkages are axially aligned and generally perpendicular with respect to the centerline of the machine frame;

raising the stabilizer leg from the ground surface;

moving the fourth linkage into abutment with the frame of the machine to establish a second ground-engaging position wherein the longitudinal axes for the first and third linkages are spaced and parallel and the longitudinal axis for the second linkage is generally parallel with respect to the centerline of the machine frame; and lowering the stabilizer leg to the ground surface in the second ground-engaging position.

19. The method of achieving multiple positions of a stabilizer leg of claim 18, wherein the step of moving the fourth linkage comprises the step of:

utilizing a hydraulically actuated cylinder connectable between the machine frame and the fourth linkage.

20. The method of achieving multiple positions of a stabilizer leg of claim 18, wherein the step of lowering the stabilizer leg in the first ground-engaging positions comprises the step of:

holding the stabilizer leg in the first ground-engaging position by releasably connecting the first linkage to the third linkage.

21. The method of achieving multiple positions of a stabilizer leg of claim 18, wherein the step of lowering the stabilizer leg in the second ground-engaging position comprises the step of:

holding the stabilizer leg in the second ground-engaging position via a releasable connection between the fourth linkage and the machine frame.

\* \* \* \* \*